United States Patent
Roos et al.

[19]

[11] Patent Number: 5,974,092
[45] Date of Patent: Oct. 26, 1999

[54] METHOD AND SYSTEM FOR MOBILE ALERTING IN A COMMUNICATION SYSTEM

[75] Inventors: David Roos, Bonds; Seok Ho Kim, North Potomac; Enrique Laborde, Gaithersburg; Neeraj Tewari, Germantown; Adrian Morris, Gaithersburg, all of Md.

[73] Assignee: Hughes Electronics Corporation, El Segundo, Calif.

[21] Appl. No.: 08/507,176

[22] Filed: Jul. 26, 1995

[51] Int. Cl.⁶ ..................................................... H04L 27/10
[52] U.S. Cl. .......................................... 375/272; 455/13.1
[58] Field of Search ........................ 340/825.54, 825.34, 340/502, 505, 313; 375/221, 272; 379/58, 59; 455/13.1, 12.1, 15, 33.1, 56.1

[56] References Cited

U.S. PATENT DOCUMENTS

| | | | |
|---|---|---|---|
| 4,940,963 | 7/1990 | Gutman et al. | 340/313 |
| 5,594,776 | 1/1997 | Dent | 379/58 |
| 5,594,782 | 1/1997 | Zicker et al. | 379/63 |
| 5,634,190 | 5/1997 | Wiedeman | 455/13.1 |
| 5,689,803 | 11/1997 | Tayloe | 455/12.1 |

*Primary Examiner*—Stephen Chin
*Assistant Examiner*—Joseph Roundtree
*Attorney, Agent, or Firm*—John T. Whelan; Michael W. Sales

[57] ABSTRACT

A method and system for alerting a mobile terminal in a high-attenuation propagation environment within a mobile satellite communication network are disclosed herein. The method comprises receiving an incoming call directed to the mobile terminal, generating a paging signal in response to the incoming call, determining whether the mobile terminal has failed to receive the paging signal, and generating an alerting signal in response to the determination that the mobile terminal has failed to receive the paging signal. The system comprises a plurality of mobile terminals capable of receiving voice calls via a satellite; a satellite adapted to communicate with each of the mobile terminals, the satellite transmitting a spot beam to the mobile terminals; at least one gateway in communication with the satellite, the gateway having a first signal generator for producing a paging signal in response to an incoming call, logic for determining whether the mobile terminal has detected the paging signal, and a second signal generator for producing a high-power alerting signal in response to the logic; a first detector in the mobile terminal for detecting the paging signal; and a second detector in the mobile terminal for detecting the alerting signal.

19 Claims, 6 Drawing Sheets

METHOD AND SYSTEM FOR MOBILE ALERTING IN A COMMUNICATION SYSTEM

BACKGROUND OF THE INVENTION

The present invention relates generally to satellite communication systems, and more particularly to a method and system for alerting mobile terminals in a high-attenuation propagation environment within a mobile satellite communication network.

Mobile satellite communication systems generally comprise at least one orbiting satellite, at least one fixed ground terminal such as a gateway, and a plurality of mobile terminals. The gateway is connected to a ground-based public-switched telephone network (PSTN). The mobile terminals communicate with the gateway or other mobile terminals via the satellite over communication channels using time division multiple access (TDMA).

Either mobile users or PSTN users can initiate calls to any mobile user subscribed to the system (the "mobile-terminated call"). The mobile-terminated call is forwarded to its destination in similar fashion to forwarding within terrestrial telephone networks. A typical call will pass through mobile switches within gateways, satellite relays, and inter-gateway links until the call reaches the mobile switch to which the mobile intended to be called (the "called party") was last registered. The mobile switch within the gateway then attempts to page the called party using signalling control channels broadcast over the satellite coverage area. When the called mobile terminal detects the page and attempts to answer the call, the mobile switch allows the call to proceed.

Mobile satellite communication systems are preferred in rural or remote areas because the coverage area of the system tends to be larger than for a terrestrial system. In general, mobile terminal users can have a direct line-of-sight path from anywhere within the coverage region to the satellite with equal ease. In this regard, there are no geographical constraints on the location and size of the coverage area.

In mobile satellite communication systems, mobile terminals typically employ a low gain omnidirectional antenna of less than 6 dB gain. The low gain antenna collects the signal sent by an orbiting satellite's spot beam, including the direct line-of-sight components of the signal and the specular ground reflection components near the terminal. The antenna also collects multipath reflection components of the direct signal from taller stationary objects such as trees, mountains, and buildings.

These reflection components can combine destructively when collected and result in attenuation or fading of the signal. Moreover, more severe signal fading or attenuation may occur if the line-of-sight path between the mobile terminal and the orbiting satellite is blocked by a building or other object. This effect is called "shadowing."

As a result of these shadowing and reflective factors, a mobile terminal might not receive a paging signal sent by a gateway. Thus, the called party may fail to answer a mobile-terminated call when the user is inside a metal-framed building, underground, or otherwise experiencing severe signal fading or attenuation. The shadowed user has no way of knowing he or she is being called. These factors contribute to the low success rate (approximately 40%) of conventional mobile terminated calls.

Therefore, there is a need for an alerting system and method to allow a caller in a mobile satellite communication network to alert a mobile terminal user that he or she is being called when the user is in a heavily shadowed area.

Furthermore, there is also a need to integrate an alerting system capable of reaching highly attenuated mobile terminals using a conventional paging system within a mobile satellite communication network.

SUMMARY OF THE INVENTION

Accordingly, the present invention is directed to a method and system that substantially obviates one or more of the problems due to limitations and disadvantages of the related art.

To achieve these and other advantages, and in accordance with the purposes of the present invention, as embodied and broadly described, the invention is a method of alerting a mobile terminal in a mobile satellite communication system. Alerting provides a high level announcement to mobile terminal handsets of mobile terminated calls. In particular, the alerting function gives the heavily shadowed user the opportunity to move to a less heavily shadowed area to receive the incoming call. The alerting function is integrated with the conventional paging function in order to attempt to reach mobile terminals that are heavily attenuated and fail to respond to conventional paging.

In one aspect of the invention, a method is provided for alerting a mobile terminal in a mobile satellite communication system comprising the steps of receiving an incoming call directed to the mobile terminal, generating a paging signal in response to the incoming call, determining whether the mobile terminal has failed to receive the paging signal, and generating an alerting signal in response to the determination that the mobile terminal has failed to receive the paging signal.

In another aspect of the invention, a method for alerting a mobile terminal in a mobile satellite communication network is provided comprising the steps of providing the mobile terminal with a paging group and a paging value, selecting an alerting channel upon location of the mobile terminal within a highly attenuated area, and monitoring the selected alerting channel for the paging value.

In yet another aspect of the invention, a system for alerting a mobile unit in a mobile satellite communication system is provided which comprises a plurality of mobile terminals capable of receiving voice calls via a satellite; a satellite adapted to communicate with each of the mobile terminals, the satellite transmitting a spot beam to the mobile terminals; at least one gateway in communication with the satellite, the gateway having a first signal generator for producing a paging signal in response to an incoming call, logic for determining whether the mobile terminal has detected the paging signal, and a second signal generator for producing a penetrating and effective high-power alerting signal in response to the logic; a first detector in the mobile terminal for detecting the paging signal; and a second detector in the mobile terminal for detecting the alerting signal.

It is to be understood that both the foregoing general description and the following detailed description are exemplary and explanatory and are intended to provide further explanation of the invention as claimed.

The invention, together with further objects and attendant advantages, will best be understood by reference to the following detailed description, taken in conjunction with the accompanying drawings.

BRIEF DESCRIPTION OF THE DRAWINGS

FIG. 8 is a block diagram showing the signal transmission and recovery procedure used in the present embodiment of the invention.

DETAILED DESCRIPTION OF THE PREFERRED EMBODIMENTS

Figure 1:
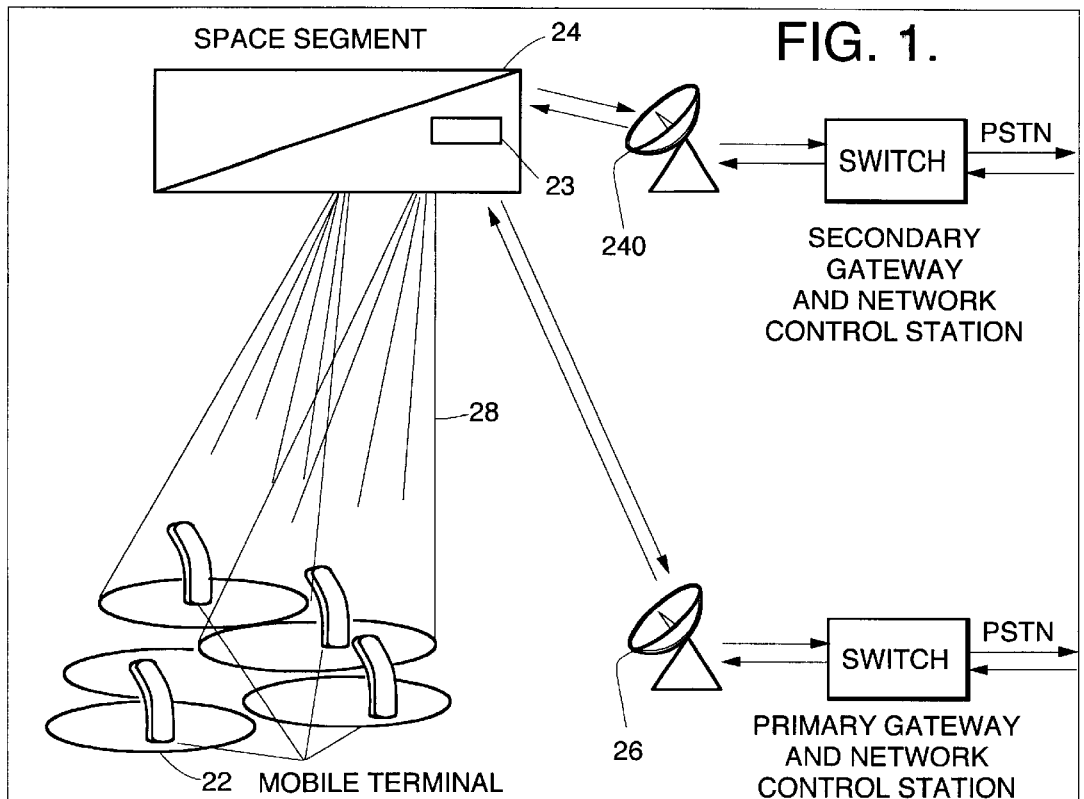
FIG. 1 is a block diagram of a mobile satellite communication system incorporating the principles of the present invention.

Referring now to the drawings, and more particularly to FIG. 1, a preferred embodiment of a mobile satellite communication system 20 is illustrated. The mobile communication system 20 includes at least one mobile terminal 22, at least one space segment 24 such as a satellite, and at least one gateway earth station 26.

The mobile terminal 22 is preferably either a handheld phone or a vehicle-mounted unit. The term mobile terminal indicates that a terminal may be used by a mobile user. It is well known in the art that a mobile terminal can also be operated in a fixed station, thus, the term mobile terminal also includes fixed terminals. The use of the term mobile terminal in this description, therefore, can also encompass fixed terminals.

The mobile terminal 22 communicates with the space segment 24 via an L-band frequency in a spot beam 28. Each spot beam 28 is associated with a predetermined geographic region. The gateway 26 communicates with the space segment 24 over a Ku band frequency. The space segment 24 includes transponders for translating between the L-band spot beam signals used by the mobile terminals 22 and the Ku-Band signals used by the gateways 26. The gateway 26 interfaces with a terrestrial telephony carrier, such as the public switched telephone network (PSTN), and may also interface with a cellular network. Thus, a user may place a call on the mobile terminal 22 to either a land line user over the PSTN or to a cellular phone user over the cellular network.

The space segment 24 preferably provides L-band-to-L-band TDMA bent pipe single hop communication to support mobile to mobile communication. At the space segment 24, the L-band uplink and downlink are transmitted via multiple spot beams. In the preferred embodiments, small spot size within each spot beam 28 provides a link margin allowing the satellite 24 to communicate with low power mobile terminals 22. In addition, the preferred embodiment provides for frequency reuse so that many, preferably about 16,000, users may be served using a limited amount of L-band spectrum. Preferably, the bandwidth of each spot beam 28 can be varied to accommodate changing traffic patterns.

Terminals to the system have a unique telephone number that allows them to receive calls when they are registered in a space segment 24 coverage area. A registration procedure locates the mobile 22 within a particular spot beam 28 coverage area when the mobile terminal 22 is turned on.

The mobile terminal 22 can receive calls from any terrestrial facility by connecting the call through one of the gateway stations 26. At this point, the gateway 26 determines the location of the mobile 22 and sends a message to the mobile terminal 22 to announce the incoming call.

The system 20 utilizes low rate encoded voice transmission. Preferably, some of the mobiles 22 are dual mode, allowing voice communications either via satellite or via the local cellular system. The gateway earth station 26 provides for user mobility as the user's mobile terminal 22 moves from spot beam 28 to spot beam 28.

In addition to the communication channels carried by the space segment 24, some of the space segment resources are used for control functions. In the preferred embodiment, one or more channels in each spot beam 28 are control channels. For example, the gateway station 26 places a forward control signal in each spot beam 28 to allow synchronization of the mobile terminals 22 and to carry network control information from the gateway station 26 to the mobile terminals 22.

The forward control channels allow mobile terminals 22 to acquire a satellite carrier and identify the spot beam 28 and gateway station 26 that originates the signal. The gateway 26 uses the forward control channel to page mobiles 22 using their unique address to announce mobile terminated calls.

Each spot beam 28 preferably contains a return direction signaling channel that mobile terminals 22 use to initiate calls or to register with the gateway 26.

During a call, in-band low data rate control channels are preferably available between the mobile 22 and the gateway 26 for call supervision, power control, and to indicate call termination.

Figure 2:
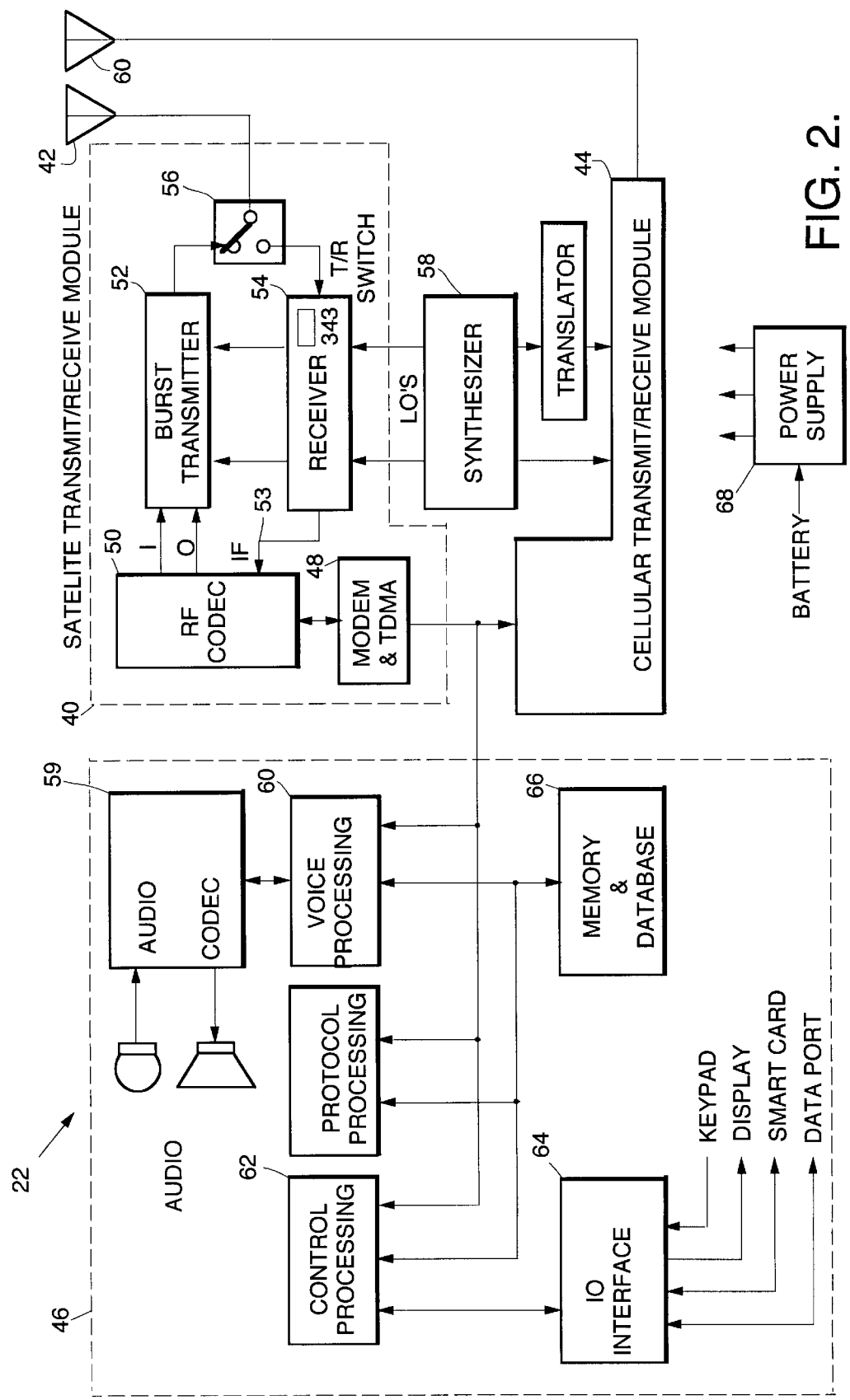
FIG. 2 is a block diagram of a preferred embodiment of a mobile terminal for use in the mobile satellite communication system of FIG. 1.

A preferred embodiment of a mobile terminal 22 is shown in FIG. 2. The mobile terminal 22 includes a satellite module 40, a satellite antenna 42, a cellular module 44, and a user interface module 46. The satellite module 40 is coupled to the user interface module 46, the cellular module 44, and the satellite antenna 42. Preferably, the satellite antenna 42 is a physically small antenna, such as a helix type antenna. The satellite module 40 includes a modem and TDMA unit 48, an RF coder and decoder 50, a burst transmitter 52, a receiver 54, and a transmit or receive (T/R) switch 56. In the preferred embodiment, the modem 48 is connected to the RF codec 50, and the RF coded 50 is connected to the burst transmitter 52 and to the receiver 54. The T/R switch 56 is connected to the burst transmitter 52, the receiver 54, and the satellite antenna 42.

Within the satellite module 40, the modem 4B converts speech or data samples to and from channel symbols using quadrature phase shift key modulation (QPSK). QPSK is preferably performed digitally by an application-specific integrated circuit or alternatively on a commercially available digital signal processor. The RF codec 50 converts channel symbols from the modem 48 into baseband I and Q signals that are transmitted to the burst transmitter 52. In the receive direction, the RF codec 50 processes an IF signal 53 from the receiver 54 for input to the modem 48.

The burst transmitter 52 converts the I and Q signals from the RF codec 50 up to a desired frequency, preferably an L-band frequency, for transmission by the first antenna 42. The receiver 54 converts a received L-band signal from the first antenna 42 into the IF signal 53 sent to the RF codec 50.

The T/R switch 56 allows the mobile terminal 22 to either transmit data or receive data. Since the preferred mobile terminal 22 does not transmit and receive simultaneously, the mobile terminal 22 does not need a large filter to isolate the transmission and reception paths. Many conventional mobile terminals require a duplexer or similar device to perform such filtering. However, conventional mobile terminals 22 with duplexers are more costly, add weight, and add approximately one-half dB of undesirable insertion loss.

The mobile terminal 22 also includes a synthesizer 58 that provides a fixed local oscillator signal for the RF codec 50. The synthesizer 58 includes a variable local oscillator for channel tuning within the satellite module 40 and generates data clock signals for the modem 48. Both the fixed local oscillator and the variable local oscillator within the synthesizer 58 may be adjusted based on commands from either the gateway 26 or from another mobile terminal 22. In the preferred embodiment, the synthesizer 58 is connected to the receiver 54 and to the cellular module 44.

The user interface module 46 includes an audio and codec unit 59, a voice processing unit 60, a controller 62, an input/output (I/O) interface 64, and a memory 66. Preferably, each element within the user interface module 46 communicates with the other user interface elements.

The audio unit 59 digitizes an audio analog signal from a telephone handset (not shown) into a digital 64 Kilobit per second (Kb/s) pulse code modulation (PCM) signal. The audio unit 59 also converts digital PCM signals into an audio signal transmitted to the telephone handset (not shown).

The voice processing unit 60 includes a voice transcoder that performs source coding to compress the digital 64 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multiband excited (MBE) type 3.6 Kb/s encoder that is well known to those skilled in the art. Both the CELP type and the MBE type encoder produce an output having a voice quality which has been measured as having a MOS (Mean Opinion Score) of 3.2. Of course, if an application allows a lower quality voice signal, such as in a military application, even lower rate encoding could be used.

The controller 62 preferably provides a multitasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port, for digital communication such as a facsimile transmission, and a smart card interface as specified for GSM.

The cellular module 44 allows the mobile terminal 22 to communicate with a cellular system over a second antenna 60. Preferably, the mobile terminal 22 operates in a first mode where the terminal 22 functions as a conventional cellular phone. In a second mode, the mobile terminal 22 preferably operates so that the mobile terminal 22 communicates with the satellite 24. A battery 68 is provided for portable operation of the mobile terminal 22.

The preferred mobile terminal 22 has many advantages. For example, the mobile terminal 22 provides dual-mode operation, either cellular or satellite. Also, the mobile terminal 22 provides high quality digital voice with a measured MOS (Mean Opinion Score) score from about 3.2 to 4.0. Further, the mobile terminal 22 allows for paging and messaging, transmission at a 2400 or 4800 bps data rate via the data port, and provides a convenient cellular-like interface. Also, the mobile terminal 22 may transmit on a single channel using a single time slot within a carrier signal allowing many other mobile terminals 22 to transmit over the same carrier. Thus, the mobile terminal 22 efficiently transmits over scarce L-band frequency resources.

Figure 3:
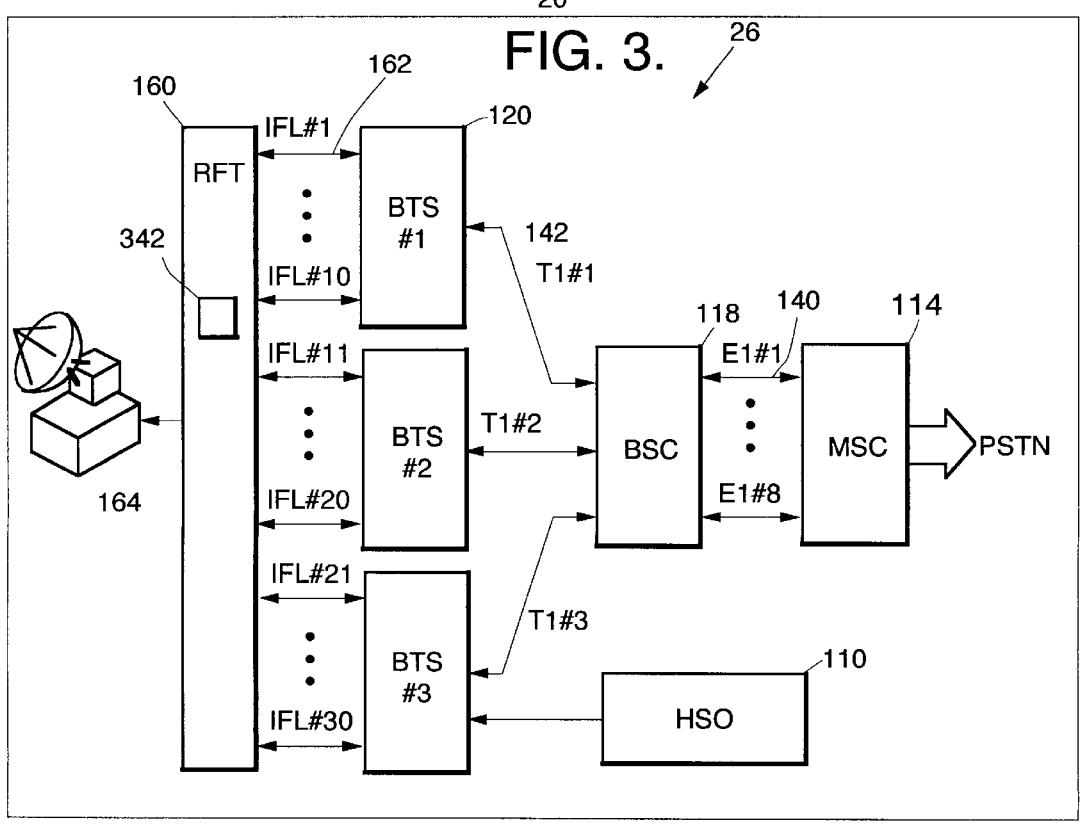
FIG. 3 is a block diagram of a preferred embodiment of a gateway earth station for use in the mobile satellite communication system of FIG. 1.

FIG. 3 is a block diagram of a preferred embodiment of a gateway 26. The gateway 26 includes a mobile switching center (MSC) 114, a plurality of base station controllers (BSCs) 118, a plurality of base transceiver stations (BTS) 120, a radio frequency unit 160, and a high-stability oscillator (HSO) 110. The MSC 114 allows communication with the public switched telephone network (PSTN) and other mobile switching centers. The MSC 114 is connected, preferably by an A-interface 140 such as a standard E1 or E3 line, with at least one BSC 118. The BSC 118 is connected through a communication channel 142, such as a T1 line, to one or more of the base transceiver stations (BTS) 120. Each BTS 120 may communicate over an RF frequency with a mobile terminal 22. The HSO 110 provides a reference frequency signal to the BSC 118 and the BTS 120. The HSO preferably has an accuracy of $\pm 1 \times 10^{-8}$.

A telephone "call" may be originated from the mobile terminal 22 by transmitting initialization data up to the space segment 24 over a control channel and then down to the gateway 26. In the preferred embodiment, the control channel is received over a time slot within a frequency assigned to a spot beam 28 having a coverage area surrounding the mobile terminal 22. At the gateway 26, the call is transmitted/received via an RF channel in the radio frequency unit 160 to the BTS 120 assigned to the spot beam 28 servicing the mobile terminal 22. From the BTS 120, the call is routed to the BSC 118, and then to the MSC 114. From the MSC 114, the call is routed to either the PSTN or another MSC. Thereafter, a communication channel is established through the entire gateway 26, and a terminal using the mobile terminal 22 may communicate over the established communication channel.

Calls may also originate from either the PSTN or another MSC. Such a call enters the gateway 26 at the MSC 114 and is routed to one of the BSCs 118. The BSC 118 then pages the mobile terminal 22 via the appropriate BTS 120. After the mobile terminal 22 responds to the page from the BTS 120, a communication channel is established.

If the mobile terminal 22 does not respond to the page from the BTS 120 after a pre-determined number of unsuccessful pages, the network will access the alerting function in accordance with the preferred embodiment of the present invention. The number of unsuccessful pages may be combined with a timeout period, for example three paging attempts each with a 5 second timeout, for a total of 15 seconds. The system then presumes that the user of the mobile terminal 22 is in a heavily shadowed area and is unable to receive the page signal from the BTS 120.

Figure 4:
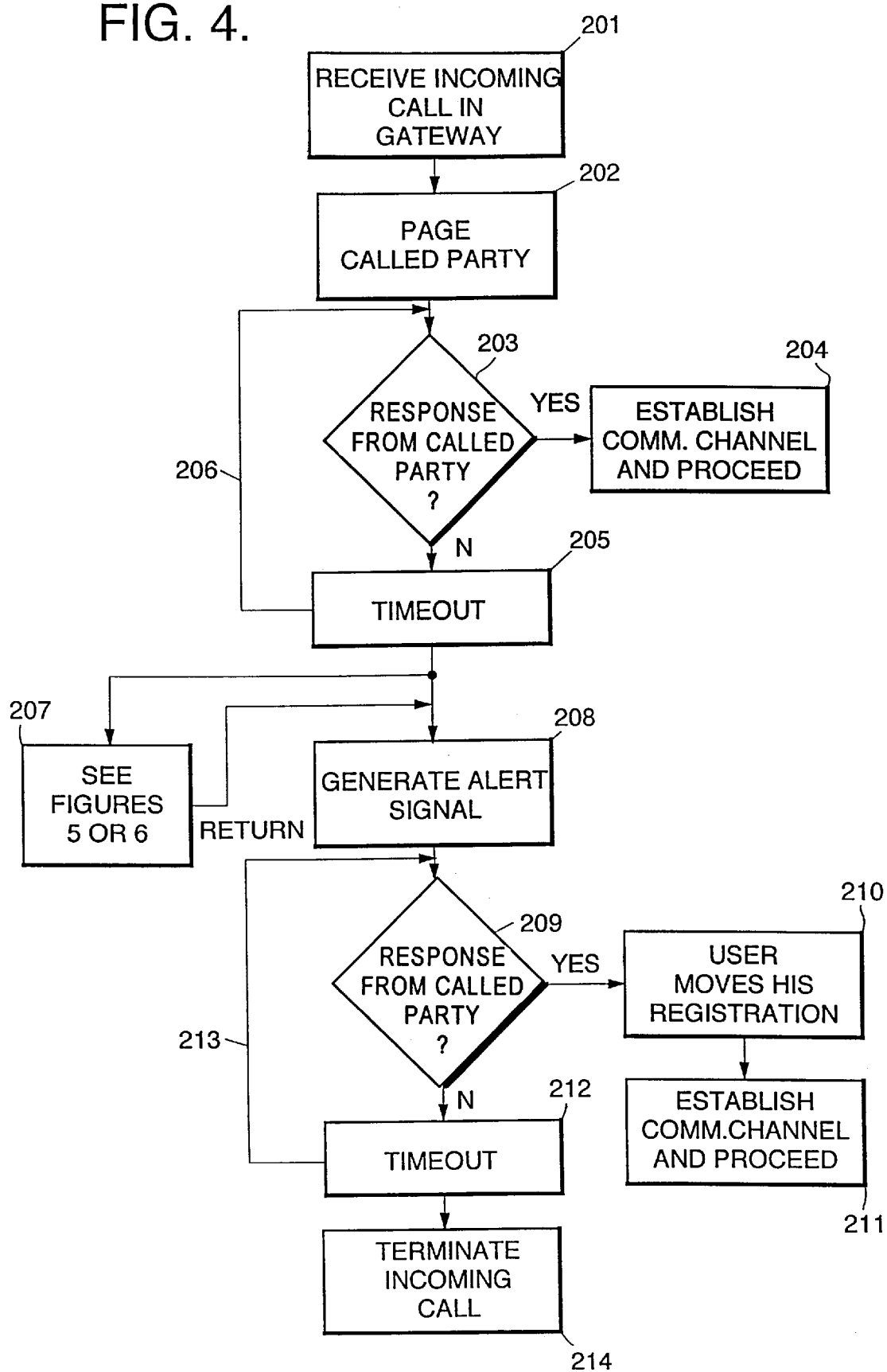
FIG. 4 is a flow diagram illustrating the alerting procedure used in a preferred embodiment of the present invention.

The method of the preferred embodiment is illustrated in the flow diagram of FIG. 4. Referring now to FIG. 4 and the previous FIGS. 1–3, FIG. 4 at block 201 shows that the incoming call enters gateway 26. The called party's mobile terminal 22 is then paged from BTS 120 as described above. If a response is received in block 203, the call and a communication channel is established at 204. However, if no response is received at block 203, a timeout period 205, typically on the order of 1–10 seconds is executed. The page is then repeated via return 206.

After a set number of timeout periods and pages, the gateway initiates an alert signal at block 208. The system then waits at blocks 209, 212, and 213 for the mobile terminal to respond to the alert signal. The response may be either an acknowledgment of receipt of the alert signal, in which case the call would be received when the user moved to a less heavily shadowed location; or the direct establishment of the communication channel by the mobile terminal user in response to the alert signal. These steps are represented by blocks 210 and 211. If no response is received after the timeout period 212, the call may be terminated at 214.

Figure 5:
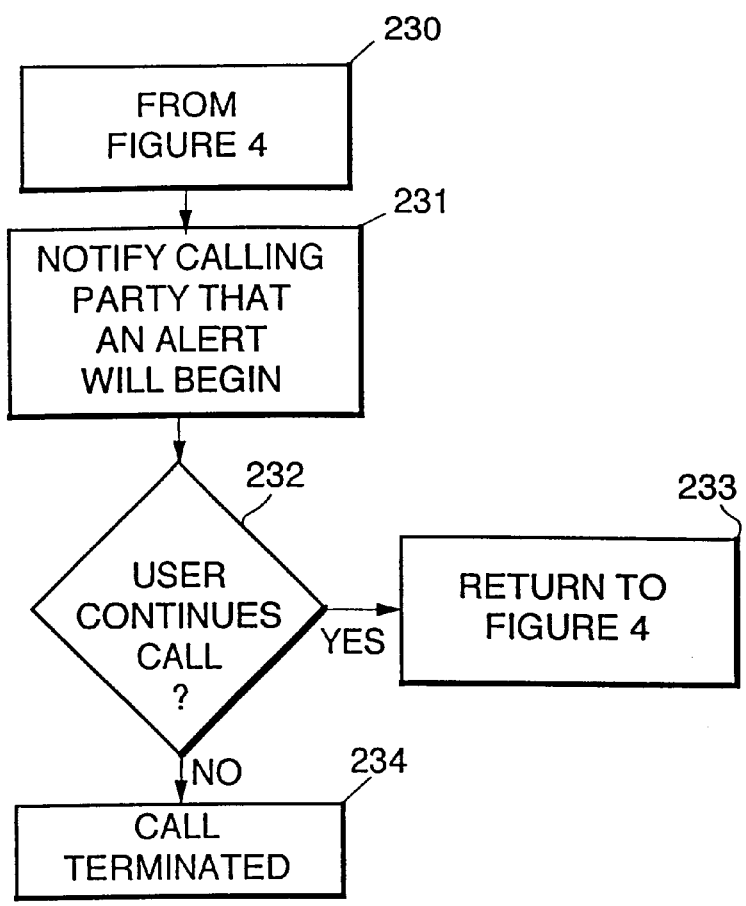
FIG. 5 is a flow diagram for connection with FIG. 4 illustrating an alternative embodiment to the embodiment of FIG. 4.

In another embodiment of the present invention, an improved alerting system may be implemented with the functions described above. FIG. 5 is a flow diagram for imposition within the flow diagram of FIG. 4, in particular with block 207 and the attendant flow paths. As shown in FIG. 5, after the pages and timeout 205 from FIG. 4, the system preferably may notify the calling party at 231 that an alert of the called party's mobile terminal 22 will be initiated. This notification may be done through a recorded message, alpha-numeric or other indicated display, or any other conventional method. At this point, the calling party can accept or decline the alerting at block 232, and either return to proceed with alerting in FIG. 4 (block 233), or terminate the call at block 234 (no alerting will take place after call termination). For further improved performance and lengthening of the answering time allowed by the originating telephone switch, the gateway 44 can originate an answer signal a short time after the notification at 231.

Figure 6:
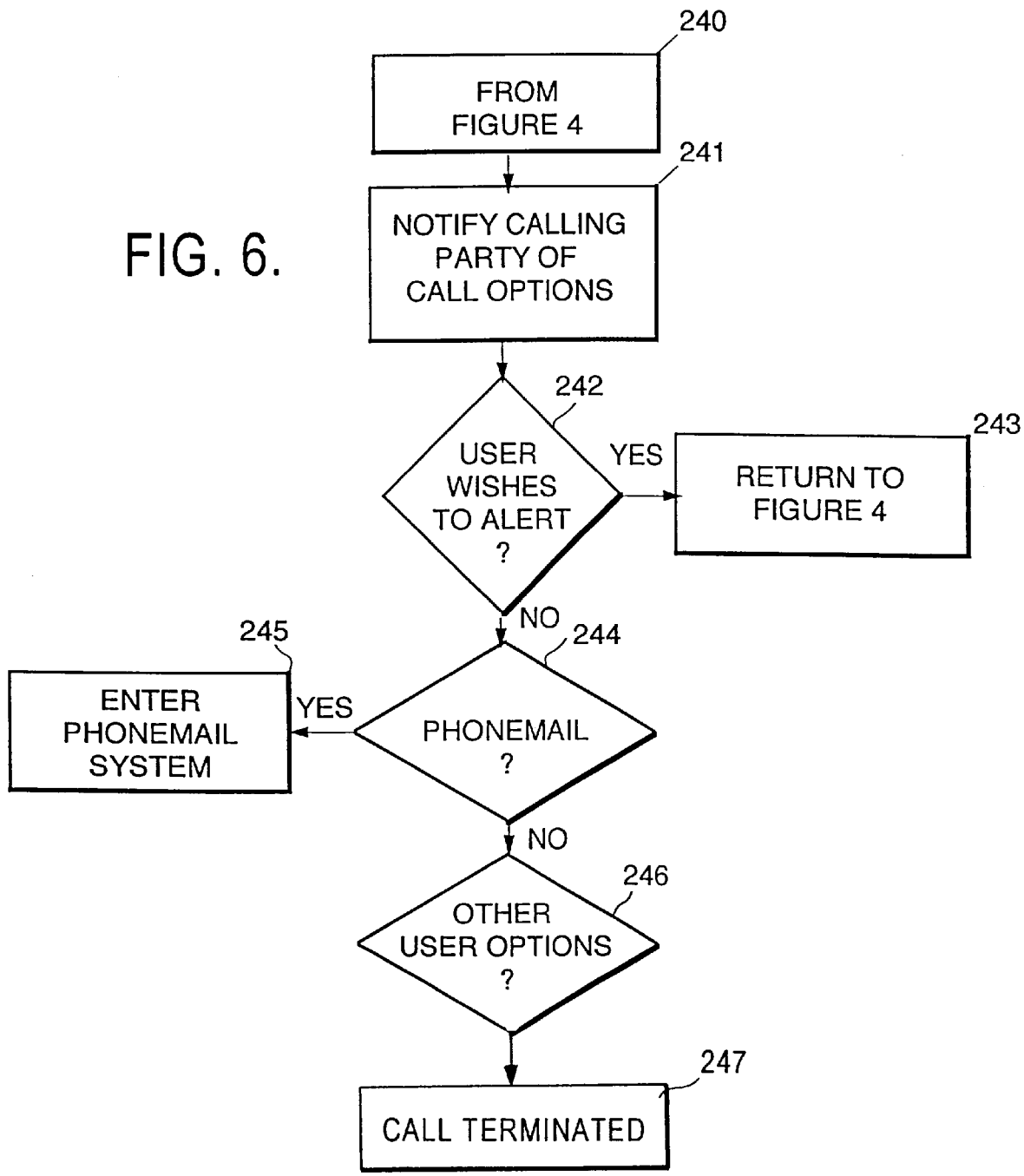
FIG. 6 is a flow diagram for connection with FIG. 4 illustrating an alternative embodiment to the embodiments shown in FIGS. 4 and 5.

A further improved alerting system may be implemented as illustrated in FIG. 6. As with the previous figure, FIG. 6 is a flow diagram for imposition within FIG. 4, in particular with block 207 and the attendant flow paths. As shown in FIG. 6, the calling party is preferably notified of several calling options at block 241 if the mobile terminal user does not acknowledge the page at block 203. The calling options preferably include effective high-power alerting (blocks 242–243), further paging (block 246), or entering a phone-mail system (blocks 244–245). Other options are also contemplated. If the calling party desires, the call may also be terminated at block 247.

Referring once again to FIG. 2, the mobile terminal 22 preferably has detector 343 within receiver 54 in the transmit/receive module 40. Detector 343 detects the incoming alerting carrier or signal from the gateway, and initiates a method of notification to the user of the mobile terminal. The detector may also be located elsewhere within the mobile terminal 22. The detector may also comprise a receive protocol which searches for an alert signal within a set time frame.

Referring once again to FIG. 3, the alert signal is preferably generated on an available voice channel or a forward control channel within gateway 26. In particular, the generator is implemented in block 342 in RFT 160. The generator may also be located elsewhere within the gateway 26. Furthermore, the signal generator may also comprise any device within the gateway used to transmit any voice or data burst.

Alerting channels are broadcast channels having one slot per channel. All the spot beams from the system's orbiting satellite include such alerting channels. The alerting channels are transmitted at the same power level as the broadcast control channels (BCC) used by the system. The number of alerting channels and their frequency assignments are configurable parameters downloaded to the mobile terminals via messages from the network. The maximum number of alerting channels for a spot beam carrying the maximum specified traffic load (assume 10 calls/second) is estimated at 12 alerting channels, assuming 50% mobile terminated calls present, a 60% unsuccessful call rate, and 0.25 alerts/second per alerting channel.

With regard to the mobile terminal 22, the mobile terminals are initially registered with the network to have a paging group and a paging value that permits the mobile terminal to operate in a sleep mode over the paging channels. As the mobile terminal enters a building or experiences propagation obstructions, the mobile terminal verifies that all other BCCs are below a certain threshold, then the mobile selects an alerting channel. The selection of the alerting channel is based on mapping the paging group to a particular alerting channel within the spot beam. The mobile terminal then enters an "alert receiving mode." The mobile listens on the selected alerting channel for its paging value on a continuous basis. Thus, no sleep mode is implemented when a mobile terminal is using the alerting channel. Periodically, the mobile terminal scans the normal BCCs and reverts to the paging channel when the signal level is adequate. Any changes in the number of alerting channels are broadcast over the control channels.

Although the alerting channel operates at the same power level as the BCCs, higher effective received signal levels (Eb/No) are obtained in the alerting channel by using (1) a lower effective bit rate that increases the energy per bit (Eb); (2) high gain forward error correction (FEC); and (3) a repetition scheme that permits diversity combining gains by decorrelating the fading conditions in the mobile terminal.

The framing structure for the alerting function is as follows. The entire population of mobile terminals within a spot beam is divided into a number of alerting groups, each of which accommodate up to 65536 mobile terminals. Thus, the alerting services can accommodate up to an integer multiple of 65536 mobile terminals within each spot beam. Each mobile terminal is assigned an alerting address of 16 bits at registration.

The alerting for one alerting group is carried on the basis of one slot per 40 msec long frame at a designated carrier frequency whose assignment is broadcast through network messages. This allows the alerting system to be reconfigured depending on the traffic configuration for each spot beam.

Figure 7:
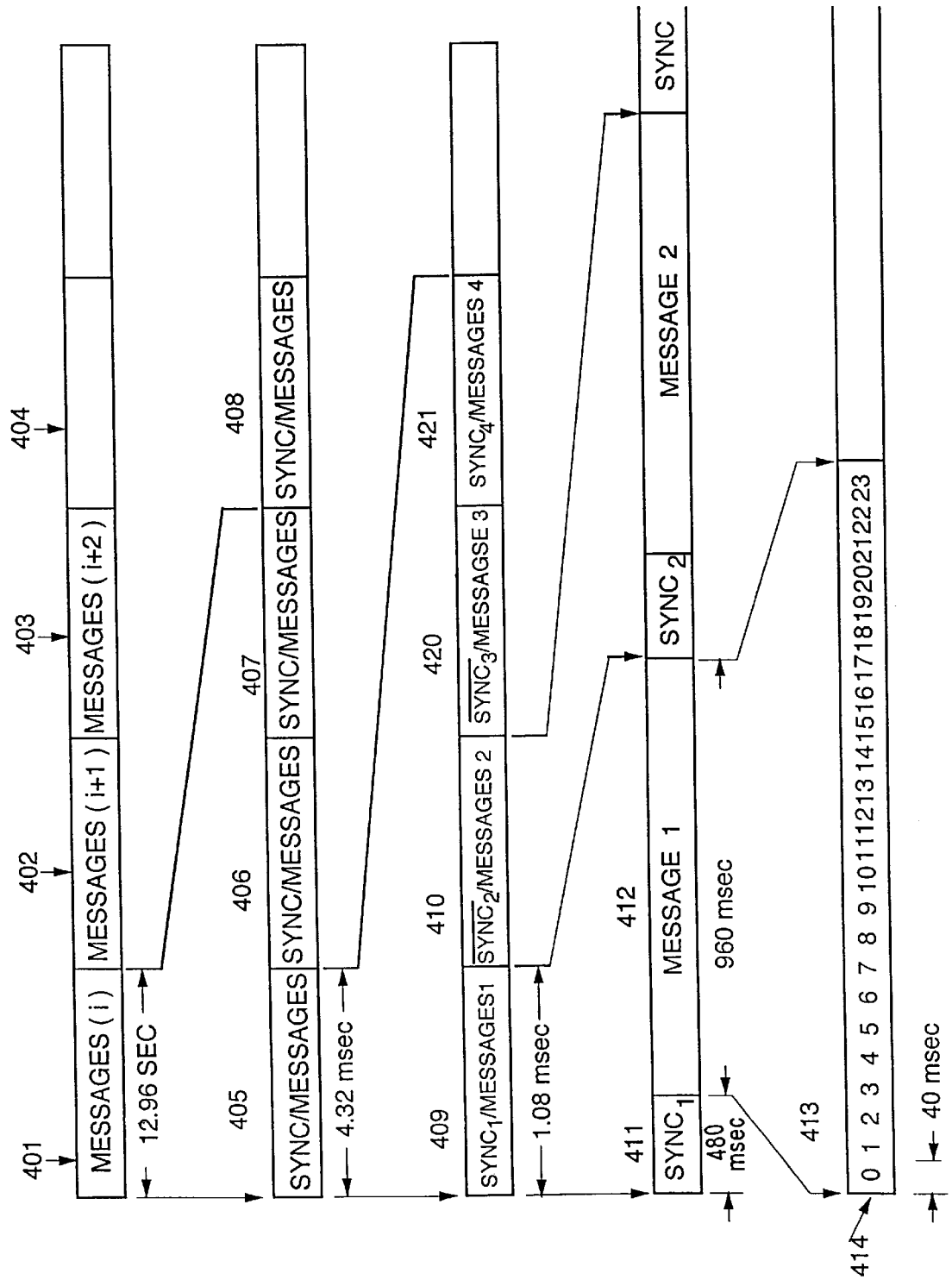
FIG. 7 is a timing chart showing the frame structure and transmission characteristics of the alert channels used in the present embodiment of the invention.

As shown in FIG. 7, the alerting service is carried as a sequence of hyper-frames 401–404, each of which is 12.96 sec long and carries synchronization words and 4 alerting messages 405–408. For a specific alerting carrier, only one slot is allocated, and the normal control channel is used to provide information concerning the hyper-frames 401–404.

Each 12.96 sec hyper-frame 401–404 is divided equally into three 4.32 sec long frames 405–407, each of which carries four 960 msec long alerting messages 412 directed to four mobile terminals. The same messages 412 are repeated over three frames to achieve 3 time diversity. The 4.32 sec long frames 405–407 also carry a 480 msec long synchronization word. The synchronization word of the first frame is the complement of those of the second and third frames.

The 4.32 sec long frame 405–407 is equally divided into four 1.08 sec long sections 409–410, 420–421, each of which carries a 120 msec long synchronization sub-word and a 960 msec long alerting message. The 120 msec long synchronization sub-word is combined to be a 480 msec long synchronization word 411. The purpose of this distributed synchronization word is to mitigate the effect of fading over time and to aid the mobile terminal in acquiring the initial synchronization, and maintaining the timing and frequency synchronization in the adverse environment. The 960 msec long alerting message 412 carries a 24 bit long alerting message 413, which consists of a 16 bit long alerting address and an 8 bit spot beam identifier.

For successful operation of the alerting function in the preferred embodiment having mobile terminals with a pre-assigned wake-up schedule, the mobile terminals in the adverse environment should preferably maintain sufficient synchronization in order to extract the alerting message during the pre-assigned wake-up time duration. When the mobile terminal is first registered, an alerting group identification code is assigned along with an alerting address. The alerting group identification uniquely determines the wake-up pattern with the reference to the hyper-frame boundary, which is defined as the start of the synchronization word 411 in the hyper-frame 401. The forward control channel should initially be in possession of the hyper-frame boundary scheme, such as a special synchronization word for aligning the control channel with the hyper-frame boundary.

If no wake-up schedule is pre-assigned to the mobile terminals, an alerting identification code and value are assigned to each mobile terminal when the mobile terminal is first registered. The alerting identification code and value may be the same as the paging group identification code and value. Using the systems' Network Information Channel (NIC), the carrier frequencies and time slots serving the alerting service are identified. Once the mobile terminal enters the alert receiving mode, the mobile terminal continuously receives alerting messages.

The transmission signaling scheme for the preferred embodiment is described below and illustrated in FIG. 8. Although many kinds of schemes can be employed for transmitting the 24 bit alerting message over a 960 msec long frame, only the frequency-shift keying (FSK)-based signaling scheme is herein described as an example. The scheme allows uniform spectral density over a 31.25 KHz voice channel, and utilizes non-coherent combining to overcome the phase noise and slot-by-slot phase incoherency. Although the FSK scheme is more robust and preferred over other methods, such as phase-shift keying (PSK), other schemes, such as spread spectrum quadrature phase shift keying (QPSK) which is comparable in performance to FSK, may also be implemented.

As described above, the 960 msec long frame is equally divided into 40 msec long frames, each of which carries 1 information bit over a 5 msec long slot. As shown in FIG. 8, the transmission scheme receives the information bit at 501. Using a rate-½ FEC encoder, at 502, 2 error-corrected bits 503 are generated. The bits are used to select one of four 32 chip long patterns at 504. ("Chip" refers to a fraction of a bit). The patterns are then grouped at 505 and converted into 8 symbols consisting of 4 chips each. At 506, each symbol is modulated using FSK, and each tone is separated by 1600 Hz, the inverse of a symbol duration of 0.625 msec.

Within the receiver, FIG. 8 illustrates the correlation and decoding process to recover the information bit. The reverse steps are shown in blocks 510–513.

The system described herein is not meant in any way to be limited by the preferred frame and signaling implementation illustrated. Any conventional techniques for carrying out the alerting and acknowledgement may be used.

The preferred embodiment illustrated herein raises the signal power level of the alerting channel to the maximum level permitted by the satellite network system design. Moreover, a low-rate encoding technique is preferably used to achieve a more robust performance in the presence of noise and fading situations.

When these improved effects are combined, the mobile alerting system illustrated can have a 30 dB link advantage or performance improvement. As an example of such an improvement, in reference to the following variables:

| | |
|---|---|
| •$P_{alert}$: | R.M.S. power of the alerting carrier, |
| •$P_{voice}$: | R.M.S. power of the voice traffic carrier, |
| •$R_{alert}$: | Information bit rate of the alerting carrier, |
| •$R_{voice}$: | Information bit rate of the voice traffic carrier, |
| •$G_{comb}$: | Processing gain induced by the combiner, |
| •$G_{CG}$: | FEC coding gain. |

The link advantage of the alerting function is given by $$10\log_{10}(P_{alert}/P_{voice})+10\log_{10}(R_{voice}/R_{alert})+G_{comb}G_{CG}.$$

For achieving the 30 dB link advantage in pure power, $$+ \leq 10\log_{10}(P_{alert}/P_{voice})+10\log_{10}(R_{voice}/R_{alert})$$

$$R_{alert} \leq \frac{R_{voice}}{10^{3-\log_{10}(P_{alert}/P_{voice})}}$$

is to be met, and if $P_{alert}$ is equal to $P_{voice}$, $R_{alert}$ is to be smaller by 316 times than $R_{voice}$.

With the proposed signaling structure, $R_{alert}$ is 66.7 bit/s compared with $R_{voice}$ of 45.138 kbit/s to make 33.3 dB link advantage from a pure power standpoint achieved by design without considering the coding gain, $G_{CG}$, and the combiner loss, $G_{comb}$.

With the proposed signaling and framing structure, an alerting burst can be repeated as fast as once every 12.96 seconds. The number of repetitions and repetition interval are configuration dependent:. Furthermore, over 2 minutes of time interval, at least 8 alertings can be provided for any alerting groups. A capacity of 0.1 alertings/sec is achievable with 3 repetitions per alerting message on an alerting carrier.

Of course, it should be understood that a wide range of changes and modifications can be made to the preferred embodiment described above. For example, the paging signal and the alerting signal may be transmitted and generated using other conventional techniques. Furthermore, the alerting signal may be more robust in nature rather than high-powered in relation to the voice signals. Thus it is intended that the foregoing detailed description be regarded as illustrative rather than limiting and that it be understood that it is the following claims, including all equivalents, which are intended to define the scope of this invention.

What is claimed is:

1. A method for alerting a mobile terminal located in a shadowed area of an incoming call in a mobile communication network, said method comprising the steps of:

receiving an incoming call directed to said mobile terminal;

generating a signal on a broadcast control channel having a power level;

generating a paging signal on a predefined paging channel in response to said incoming call;

if said mobile terminal fails to acknowledge said paging signal, generating an alerting signal on a predefined alerting channel, the alerting channel operating at the same power level as the broadcast control channel but achieving a higher effective received signal level by employing (1) a lower effective bit rate than the broadcast control channel and (2) a repetition scheme that permits diversity combining gains by decorrelating fading conditions in the mobile terminal; and, if the mobile terminal acknowledges said alerting signal, connecting said incoming call on a communication channel after the mobile terminal has left the shadowed area.

2. The method as recited in claim 1 wherein the step of generating an alerting signal further comprises the substeps of:

generating said alerting signal on said alerting channel at the maximum power level permitted by the system.

3. The method as recited in claim 1 wherein the step of generating an alerting signal further comprises the substeps of:

encoding an information bit at a rate sufficient to generate two forward-error-corrected bits;

selecting a pre-determined pattern of bit fractions corresponding to said forward-error-corrected bits;

converting said pattern into symbols; and modulating said symbols.

4. The method as recited in claim 3 wherein said step of modulating said symbols utilizes frequency shift keying.

5. The method as recited in claim 4 further comprising the steps of:

receiving a received signal;

computing frequency shift keying correlations from said received signal;

computing a hard decision to recover two forward-error-corrected bits; and decoding said bits to recover one bit.

6. The method as recited in claim 3 wherein said step of modulating said symbols utilizes a modulation method equivalent in performance to frequency shift keying.

7. The method as recited in claim 6 wherein said step of modulating said symbols utilizes quadrature phase shift keying.

8. The method as recited in claim 1 further comprising the step of detecting said alerting signal in said mobile terminal.

9. The method as recited in claim 1 further comprising the steps of:

interrupting said incoming call before generating said alerting signal; and informing an originator of said incoming call that alerting will occur.

10. The method as recited in claim 1 further comprising the steps of:

providing a menu of options to an originator of said incoming calls before generating said alerting signal.

11. The method as recited in claim 10 wherein the menu of options comprises at least one of the group consisting of: generating said alerting signal, generating a second paging signal, and entering a phonemail system.

12. For use with a mobile communication system, a method of detecting an incoming call with a mobile terminal in a shadowed area comprising the steps of:

monitoring a paging channel for a paging signal indicating an incoming call;

monitoring at least one broadcast control channel;

if the at least one broadcast control channel becomes attenuated below a predefined threshold level, monitoring a predefined alerting channel for an alerting signal;

if the alerting signal is detected on the predefined alerting channel, transmitting an acknowledgment signal to the mobile communication system; and, receiving the incoming call after the mobile terminal has left the shadowed area.

13. A method as defined in claim 12 wherein the step of monitoring a paging channel for a paging signal is performed periodically.

14. A method as defined in claim 12 wherein the step of monitoring a predefined alerting channel for an alerting signal is performed on a continuous basis when the at least one broadcast control channel is attenuated below the predefined level.

15. For use in a communication network employing at least one broadcast control channel operating at a power level, a device for alerting a mobile terminal located in a shadowed area of an incoming call comprising:

a first generator responsive to an incoming call for generating a paging signal on a paging channel;

a first receiver for detecting signals from the mobile terminal;

a logic circuit coupled to the first generator and the first receiver; and, a second generator responsive to the logic circuit for generating an alerting signal on an alerting channel if the first receiver does not receive an acknowledgment signal from the mobile terminal within a predefined time period after generation of the paging signal, the alerting channel operating at the same power level as the broadcast control channel but achieving a higher effective received signal level by employing (1) a lower effective bit rate than the broadcast control channel and (2) a repetition scheme that permits diversity combining gains by decorrelating fading conditions in the mobile terminal, wherein the logic circuit is adapted to connect the incoming call to the mobile terminal after the mobile terminal acknowledges the alerting signal and the mobile terminal has moved out of the shadowed area.

16. For use with a communication system, a mobile terminal comprising:

a transmitter for transmitting signals to the communication system;

a receiver for receiving incoming calls and paging signals, the receiver being adapted for receiving signals on at least one broadcast control channel;

a detector for detecting an alerting signal on an alerting channel; and a logic circuit coupled to the receiver and the detector for activating the detector to monitor the alerting channel for an alerting signal if the signals received by the receiver on the at least one broadcast control channel fall below a predetermined threshold level, wherein, if an alerting signal is detected by the detector, the logic circuit activates the transmitter to transmit an acknowledgment signal to the communication system and activates the receiver to receive the incoming call when the signals received on the at least one broadcast control channel exceed the predetermined threshold level.

17. A method for alerting a mobile terminal located in a shadowed area of an incoming call in a mobile communication network, said method comprising the steps of:

receiving an incoming call directed to said mobile terminal;

generating a paging signal on a predefined paging channel in response to said incoming call;

if said mobile terminal fails to acknowledge said paging signal, interrupting said incoming call, informing an originator of said incoming call that alerting will occur, and generating an alerting signal on a predefined alerting channel; and, if the mobile terminal acknowledges said alerting signal, connecting said incoming call on a communication channel after the mobile terminal has left the shadowed area.

18. A method for alerting a mobile terminal located in a shadowed area of an incoming call in a mobile communication network, said method comprising the steps of:

receiving an incoming call directed to said mobile terminal;

generating a paging signal on a predefined paging channel in response to said incoming call;

if said mobile terminal fails to acknowledge said paging signal, providing a menu of options to an originator of said incoming calls comprising at least one of the group consisting of: generating an alerting signal, generating a second paging signal, and entering a phonemail system associated with the mobile terminal;

if the originator selects the alerting signal option, generating an alerting signal on a predefined alerting channel;

if the originator selects the second paging signal option, generating a second paging signal on the predefined paging channel;

if the originator selects the phonemail system option, connecting the call to the phonemail system; and, if the mobile terminal acknowledges said alerting signal, connecting said incoming call on a communication channel after the mobile terminal has left the shadowed area.

19. A method for alerting a mobile terminal located in a shadowed area of an incoming call in a mobile communication network, said method comprising the steps of:

receiving an incoming call directed to said mobile terminal;

generating a paging signal on a first communication channel in response to said incoming call;

if said mobile terminal fails to acknowledge said paging signal, generating an alerting signal on a predefined alerting channel at the maximum power level permitted by the system; and, if the mobile terminal acknowledges said alerting signal, connecting said incoming call on said first communication channel after the mobile terminal has left the shadowed area.

* * * * *